United States Patent [19]

Sasaki et al.

[11] 4,290,562

[45] Sep. 22, 1981

[54] HUB FOR USE IN A MAGNETIC RECORDING TAPE CASSETTE

[75] Inventors: Shigeo Sasaki, Kyoto; Osamu Yamamoto, Takatsuki, both of Japan

[73] Assignee: Hitachi Maxell, Ltd., Osaka, Japan

[21] Appl. No.: 198,647

[22] Filed: Oct. 20, 1980

[30] Foreign Application Priority Data

Oct. 20, 1979 [JP] Japan .......................... 54-145412[U]
Oct. 20, 1979 [JP] Japan .......................... 54-145413[U]

[51] Int. Cl.³ ........................................... B65H 75/28
[52] U.S. Cl. .................................................... 242/74
[58] Field of Search ........................ 242/74, 74.1, 74.2

[56] References Cited

U.S. PATENT DOCUMENTS

| | | | |
|---|---|---|---|
| 3,620,469 | 11/1971 | Riedel | 242/74 |
| 3,661,395 | 5/1972 | Ritz | 242/74.1 |
| 3,990,733 | 11/1976 | Shiba | 242/74 |
| 4,181,272 | 1/1980 | Shiba | 242/74.1 |

Primary Examiner—Edward J. McCarthy
Attorney, Agent, or Firm—Birch, Stewart, Kolasch and Birch

[57] ABSTRACT

A hub for use in a magnetic recording tape cassette comprising an engagement recess defined in the cylindrical peripheral surface of the hub and a clamp piece having a pair of elastically deformable lugs. When the clamp piece is fitted in the engagement recess with the magnetic recording tape inserted therebetween, the tape is secured on the hub by clamping the tape between the free ends of the lugs and the side walls of the engagement recess.

8 Claims, 5 Drawing Figures

HUB FOR USE IN A MAGNETIC RECORDING TAPE CASSETTE

BACKGROUND OF THE INVENTION

The present invention relates to a hub for use in a magnetic recording tape cassette, and more particularly to an improvement to the means of stopping the end of the magnetic tape to the hub to be set in various kinds of magnetic tape cartridges.

According to general practice, the hub is provided with an engagement recess or a notch at a certain position on its outer peripheral surface, so that an end of the magnetic tape is inserted in said recess and then an elastically deformable plastic clamp piece is forced into said recess under partial deformation so as to engage the recess, and thus the end of the magnetic tape is stopped between the engagement recess and the clamp piece under pressure.

In the hubs having such a tape clamping structure it is usual for the end part of the clamp piece to be elastically deformed and set in pressure contact with the innermost part of the engagement recess in a slip-proof form, so that the elastic deformation of the end part of the piece is apt to affect to the outer surface of the piece. As a result, such drawbacks are induced that a change may occur to the curvature of the outer surface of the piece which was formed to have the same curvature as that of the outer peripheral surface of the hub, or a gap may be formed between the external surface of the piece and the outer peripheral surface of the hub, by which the hub as a whole may lose its true circle form, with the result that irregularities may be caused to the layer of the tape wound on the hub. In the case of the hub of a type in which the clamp piece is to be forcibly set into the engagement recess, an elastic deformation takes place also on the engagement recess, which causes a large gap between the clamp piece and the open edges of the engagement recess, thus giving rise to further increment of irregular winding of the tape.

SUMMARY OF THE INVENTION

With the above fact specifically noted, it is the primary object of the present invention to have the clamp piece of a hub for use in a tape cassette partially deformed elastically without undue force, so that it is quite easily guided into the engagement recess of the hub, and to perform effectively and securely slip-proof stopping of the clamp piece itself and pressure-stopping of the end part of the magnetic tape with the engagement recess.

The second object of the present invention is to adopt such a structure in a clamping device of a hub that the partial elastic deformation of the clamp piece in the engagement recess does not substantially extend to the outer surface of the piece, whereby the outer surface of the piece maintains the same curvature as the outer peripheral surface of the hub, and formation of a gap between the clamp piece and the socket side of the engagement recess is prevented as much as possible, and thus irregular winding of tape is obviated.

In order to complete the object of the present invention, there is provided a hub for use in a magnetic recording tape cassette which comprises an annular body having a cylindrical outer peripheral surface on which a magnetic tape is wound, an engagement recess defined in the outer peripheral portion of the body and a clamp piece fitted in the engagement recess, wherein the engagement recess comprises an entrance opening at the cylindrical outer peripheral surface of the body, a pair of protrusions protruded inwardly of the recess to define a first space narrower than the width of the entrance opening at the intermediate portion of both the lower side walls of the engagement recess and an inner recess defined by a bottom face of the engagement recess and both the side walls thereof with a second space wider than the first space, the clamp piece comprising a top portion having an arcuated surface with the substantially same curvature as the cylindrical outer surface of the annular body and with such a length in a circumferential direction that the top portion closes the entrance opening, a bottom portion having a pair of lugs protruding substantially towards the top portion from both sides of said bottom portion with such a length that, when the clamp piece is fitted in the engagement recess, the lugs engage the lower side walls of the recess and an intermediate portion for connecting the top portion and the bottom portion, whereby when the clamp piece is fitted in the engagement recess with the magnetic tape inserted therebetween, the magnetic tape is secured on the hub in such a manner that the magnetic tape is clamped between the ends of the lugs and at least one of the side walls of the engagement recess.

BRIEF DESCRIPTION OF DRAWINGS

The present invention will be described hereinafter in conjunction with a preferred embodiment of a hub for use in a magnetic recording tape cassette according to the present invention with reference to the attached drawings in which.

DETAILED DESCRIPTION OF THE INVENTION

Figure 1:
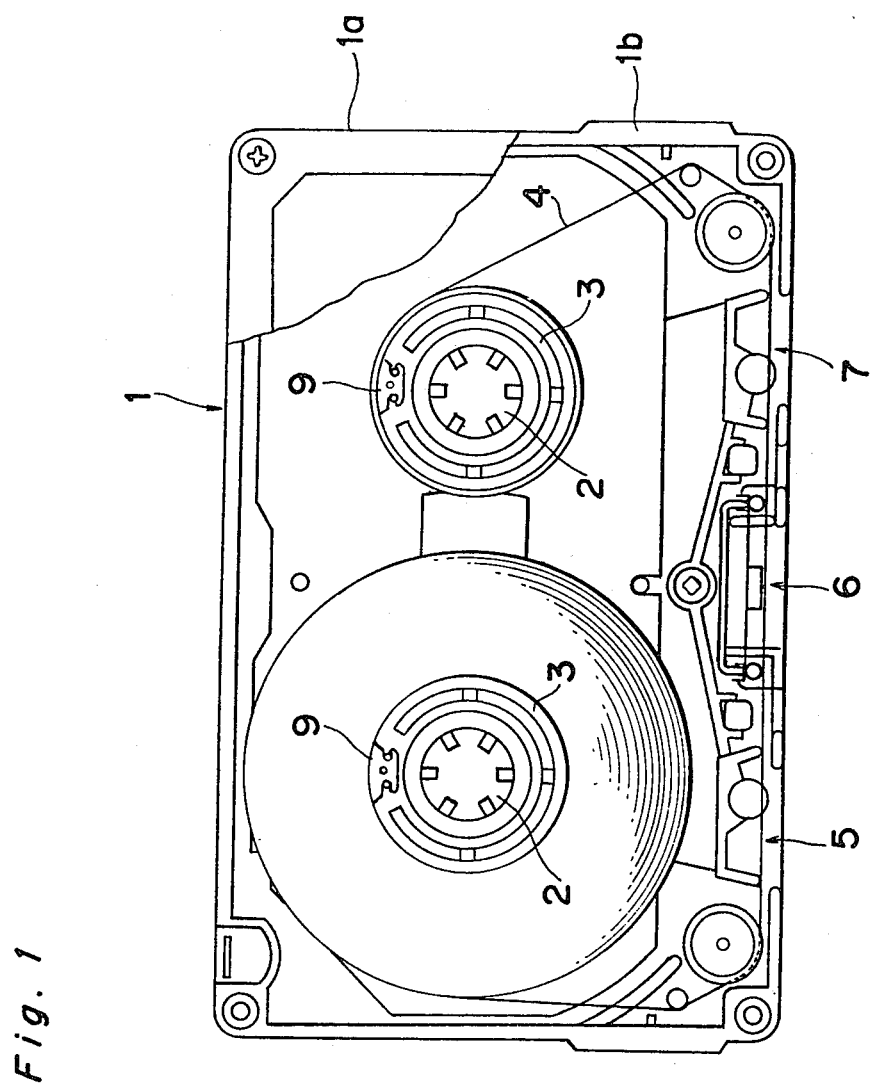
FIG. 1 is a partially cut plan view to show an example of the magnetic recording tape cassette according to the present invention.

FIG. 1 illustrates a Philips type magnetic tape cassette of standard specification. The cassette case 1 comprises a pair of plastic cases 1a and 1b which are combined together by means of screws to form an enclosure. Onto the drive shaft insertion holes 2,2 provided symmetrically against the central part of the case, hubs 3,3 made of polyacetal resin are rotatably set, and on these hubs 3 a magnetic tape 4 is wound with its two ends which are usually the leader tape portion clamped. The magnetic tape 4 is so arranged as to be reeled out from the supply hub 3 on one side, led through the erasing head insertion hole 5, the recording and reproducing magnetic head insertion hole 6, and the pinch roller insertion hole 7 in order which are provided in the front wall of the case 1, and taken up onto the other hub 3 on the take-up side.

Figure 2:
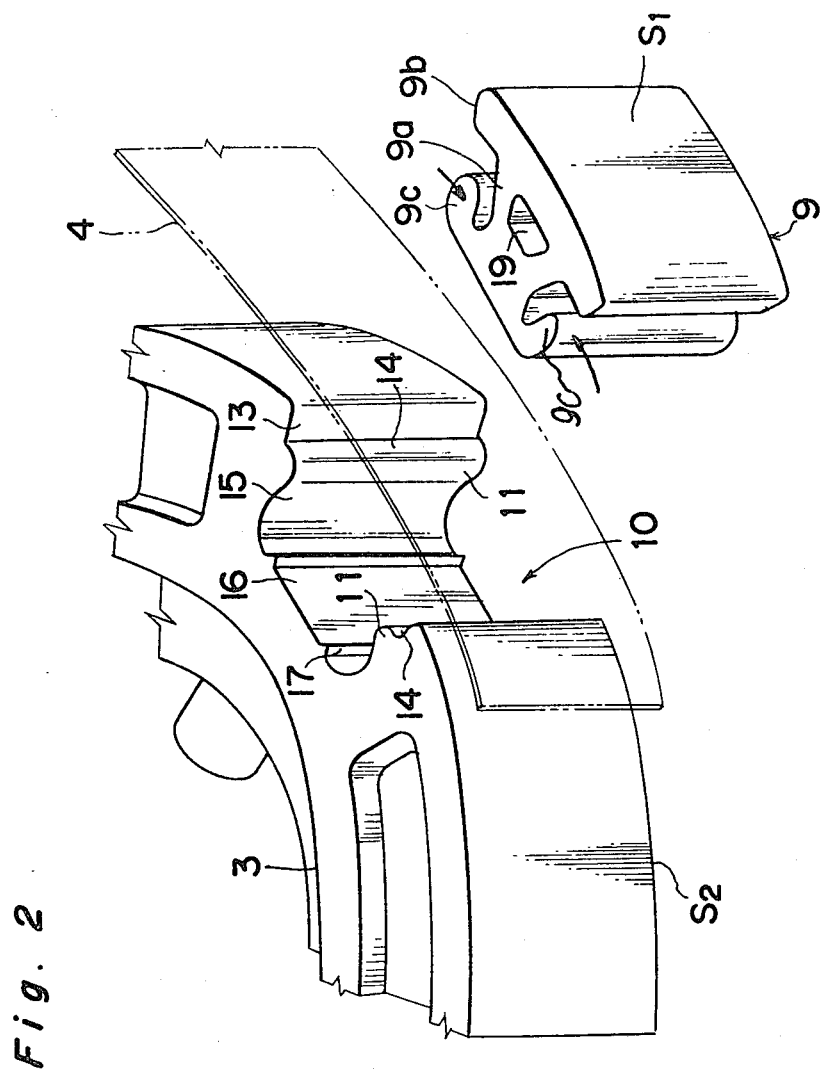
FIG. 2 is an exploded perspective view of a hub according to the present invention showing a way of clamping a tape to the hub.

In FIG. 2, the end part of the magnetic tape 4 is stopped to the hub 3 mediated by a plastic clamp piece 9 which is elastically deformable. The clamp piece 9 is formed of a polyacetal resin, polyethylene resin, or polypropylene resin.

The hub 3 has, at a portion on its cylindrical outer peripheral surface, an engagement recess 10 of a certain width and a certain depth toward the center of the hub. The engagement recess 10 is formed to have narrow width at the middle portions of the depthwise walls by means of the protrusions 11,11 formed on the opposed inner walls. The two opposed inner walls 13,13 at the entrance opening 10b more external than the middle narrow width portion 10a are formed into outwardly widened form having the stepped surfaces 14,14, and the two opposed inner walls 15,15 of the innermost opening 10c more internal than said narrow width portion 10a are formed into the curved, internally widened forms. The bottom face 16 of the engagement recess 10 is provided symmetrically with a pair of vertical ribs 17,17.

Figure 3:
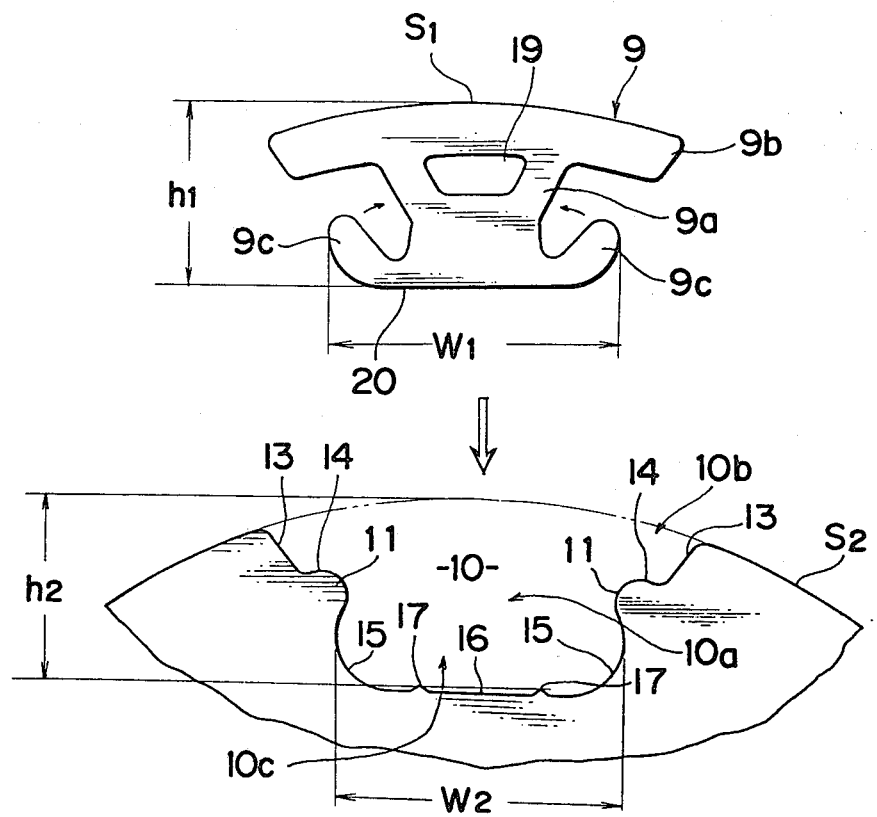
FIG. 3 is a partial exploded plan view of FIG. 2.

On the other hand, the clamp piece 9 is so formed as to have the middle portion 9a in the direction of fitting the clamp piece 9 into the recess 10 with a width slightly narrower than the width of the middle narrow portion 10a of the engagement recess 10, a top portion 9b of the clamp piece 9, whose outer surface S1 is formed to have substantially the same curvature as the cylindrical outer peripheral surface S2 of the hub 3, and the elastic lugs 9c,9c symmetrically at the further ends of the middle portions 9a, all these being unilaterally formed. Also, at the central area of the middle portion 9a there is formed a through hole, so that the middle portion 9a ultimately has a Y-shaped cross-section. On the plan views in FIG. 3, the width W1 between the elastic lugs 9c and 9c of the clamp piece 9 in free condition is set to be slightly larger than the inside breadth W2 of the innermost opening 10c (W1>W2), and the whole height h1 of the piece 9 is set to be nearly equal to the depth h2 of the engagement recess 10 from the imaginary outer peripheral surface to the projecting end of the vertical ribs 17, so that, when the clamp piece 9 is forced into the recess, the bottom face 20 of the clamp piece 9 shall be elastically brought into contact with the top of the vertical ribs 17,17 to form a gap 21 between the end face 20 of the clamp piece 9 and the bottom face 16 of the recess 10.

Figure 4:
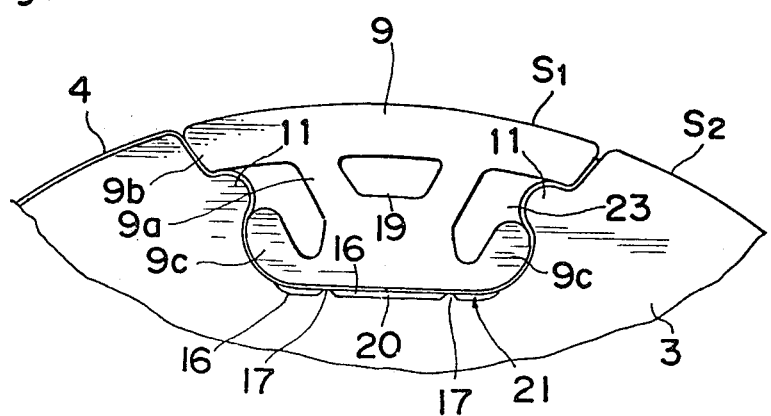
FIG. 4 is a partial plan view to show an engaged condition thereof.

With the construction formed as above, when the clamp piece 9 is forced into the engagement recess 10 with the magnetic tape 4 held therebetween, the elastic lugs 9c,9c at the end side of the piece are pressed by the projections 11,11 of the engagement recess 10 and deformed elastically toward the middle portion 9a as indicated in arrow marks, and thus the clamp piece 9 is fitted into the innermost opening 10c of the engagement recess 10. And, as shown in FIG. 4, when the clamp piece 9 is fully fitted in, the outer top portion 9b thereof is loosely fitted to the entrance opening 10b of the engagement recess 10 and is supported thereat, and the both ends of the elastic lugs 9c,9c are set in pressure contact with the opposed inner walls 15,15 of the innermost opening 10c with the magnetic tape 4 held therebetween by their elastic recovery forces, and additionally the bottom face 20 of the clamp piece 9 is elastically in contact with the vertical ribs 17,17 on the bottom face 16 of the engagement recess 10.

Figure 5:
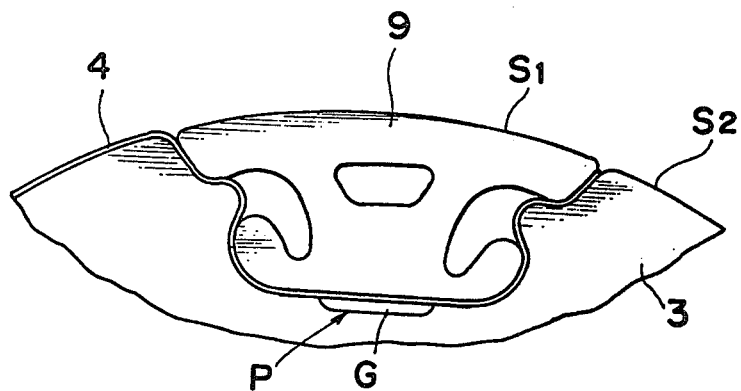
FIG. 5 is a plan view to show an engaged condition in another embodiment of the present invention.

Alternatively, instead of forming the vertical ribs 17 on the bottom face 16 of the engagement recess 10, the vertical ribs 17 may be formed on the bottom face 20 of the clamp piece 9 so that the vertical ribs 17 may abut on the bottom face 16 of the engagement recess 10, or further, there may be formed a groove P in a direction of the thickness of the hub, on either the bottom face 16 of the engagement recess 10 or in the middle portion of the bottom face 20 of the clamp piece 9 which is opposed to contact with said bottom face 16, thereby providing a small gap between the bottom face 16 of the engagement recess 10 and the middle portion of the bottom face 20 of the clamp piece 9. As shown in FIG. 5, when injection gates for molding of the clamp piece and the hub body are provided, it is possible to prevent an accident of the magnetic tape from breaking by the traces of these injection gates while setting the clamp piece to the hub body.

The rib and the groove may respectively be single or plural, or, may not be provided if there is no such problem as above that may be caused by the trace of the injection gate.

The elastic lugs 9c to be formed on the both ends of the clamp piece 9 may have various modified shapes. For example, they may be formed into hollow cross-sectional shapes having for example through holes therein.

Further, when a through hole 19 is formed at the central part of the middle area 9a of the clamp piece 9 to make the cross-sectional shape of the middle area 9a a Y-letter form, it makes possible to avoid the deformation of the curvature of the top face 9b of the clamp piece 9, not only by absorbing the elastic deformation action which spreads over to the middle area 9a due to the deformation of the lugs 9c but also by reducing the wall thickness differences of the whole piece to the best possible degree, thus reducing the uneven constrictive deformations during cooling of the molding, i.e., sink marks, and improving the molding precision of the outer plate portion 9b. However, depending on the shape of the middle portion 9a, said through hole 19 may not be necessary. In order to make the middle portion 9a Y-form to improve the molding precision of the top portion 9b, it is not essential to form a through hole 19 at the central part of the middle portion 9a, but, for example, the area of 19 may be formed into a recess.

According to the present invention designed as above, the end of the magnetic tape 4 is held mainly under strong pressure between the elastic lugs 9c of the clamp piece 9 and the two opposite inside surfaces 15,15 at the innermost opening 10c of the engagement recess 10.

As above, due to the arrangements to clamp the magnetic tape 4 locally at many positions in the engagement recess, the magnetic tape 4 can be clamped relatively securely and rigidly.

Further, there is a construction that the middle portion 9a of the clamp piece 9 is set to have the smaller width than the middle narrow width portion 10a of the engagement recess 10 so as to form a gap 23 under the condition where the clamp piece 9 is engaged with the engagement recess 10. Accordingly, when the elastic lugs 9c of the piece 9 are pressure-fitted in elastically deformed condition into the innermost opening 10c of the engagement recess 10, the elastic deformation of said elastic lugs 9c takes place only on the free end portion thereof beyond the middle portion 9a, without causing the top portion 9b to be deformed. Therefore, when the top portion 9b of the clamp piece 9 is exactly dimensioned, it is possible to prevent formation of irregular steps between the outer surface S1 of the clamp piece 9 and the cylindrical outer peripheral surface S2 of the hub, with the outside surface S1 of the piece kept to the same curvature as that of the cylindircal outer peripheral surface S2 of the hub, and also it is possible to prevent as far as possible formation of a gap between the clamp piece 9 and the both side walls of the entrance opening 10b of the engagement recess 10.

What is claimed is:

1. A hub for use in a magnetic recording tape cassette which comprises
   an annular body having a cylindrical outer peripheral surface on which a magnetic recording tape is wound,
   an engagement recess defined in the outer peripheral portion of the annular body and
   a clamp piece fitted in the engagement recess, wherein
   said engagement recess comprising an entrance opening formed in the cylindrical outer peripheral surface of the annular body, a pair of protrusions protruded inwardly of the recess to define a first space narrower than the width of the entrance opening on the intermediate portion of the both lower side walls of the engagement recess and an inner recess defined by a bottom face of the engagement recess and the both side walls thereof with a second space wider than the first space,
   said clamp piece comprising a top portion having an arcuated surface with the substantially same curvature as the cylindrical outer surface of the annular body and with such a length in a circumferential direction that the top portion closes the entrance opening, a bottom portion having a pair of lugs protruding substantially towards the top portion from the both sides of said bottom portion with such a length that, when the clamp piece is fitted in the engagement recess, the lugs are engaged with the lower side walls of the recess and an intermediate portion for connecting the top portion and the bottom portion, whereby when said clamp piece is fitted in the engagement recess with the magnetic tape inserted therebetween, the magnetic tape is secured on the hub in such manner that the magnetic tape is clamped between the ends of the lugs and at least one of the side walls of the engagement recess.

2. A hub for use in a magnetic recording tape cassette according to claim 1, wherein the lower face of the end part of the top portion of the clamp piece is positioned closely above the stepped portion formed by the upper face of the protrusion of the engagement recess.

3. A hub for use in a magnetic recording tape cassette according to claim 1, wherein the intermediate portion of said clamp piece is formed into Y-letter configuration.

4. A hub for use in a magnetic recording tape cassette according to claim 3, wherein a hole is provided in the intermediate portion of the clamp piece.

5. A hub for use in a magnetic recording tape cassette according to claim 1, wherein a gap is formed between the bottom face of the clamp piece and the bottom face of the engagement recess.

6. A hub for use in a magnetic recording tape cassette according to claim 5, wherein a single or plural ribs are provided on the bottom face of either the engagement recess or the clamp piece.

7. A hub for use in a magnetic recording tape cassette according to claim 5, wherein a single or plural grooves are provided on either the bottom face of the engagement recess ot the bottom surface of the clamp piece.

8. A magnetic recording tape cassette having at least one hub for winding the recording tape wherein at least one hub is the hub as defined in claim 1.

* * * * *